(12) United States Patent
Gerlach et al.

(10) Patent No.: US 10,531,502 B2
(45) Date of Patent: Jan. 7, 2020

(54) DEVICES, METHODS AND COMPUTER PROGRAM FOR PRODUCING A COMMUNICATION LINK BETWEEN AN INFORMATION SYSTEM OF A TRANSPORTATION VEHICLE AND A MOBILE DEVICE

(71) Applicant: VOLKSWAGEN AKTIENGESELLSCHAFT, Wolfsburg (DE)

(72) Inventors: Simon Gerlach, Meine (DE); Gerd Penshorn, Edemissen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/065,833

(22) PCT Filed: Dec. 1, 2016

(86) PCT No.: PCT/EP2016/079501
§ 371 (c)(1),
(2) Date: Jun. 25, 2018

(87) PCT Pub. No.: WO2017/108370
PCT Pub. Date: Jun. 29, 2017

(65) Prior Publication Data
US 2019/0014604 A1    Jan. 10, 2019

(30) Foreign Application Priority Data

Dec. 23, 2015    (DE) ........................ 10 2015 226 643

(51) Int. Cl.
*H04W 4/80*    (2018.01)
*H04W 84/18*    (2009.01)
(Continued)

(52) U.S. Cl.
CPC ............. *H04W 76/10* (2018.02); *H04L 67/12* (2013.01); *H04W 4/40* (2018.02); *H04W 4/80* (2018.02);
(Continued)

(58) Field of Classification Search
CPC ..... H04W 8/005; H04W 12/003; H04W 4/48; H04W 4/80; H04W 76/14; H04W 48/16;
(Continued)

(56) References Cited

U.S. PATENT DOCUMENTS

2013/0017816 A1*  1/2013  Talty ................... H04W 76/14
                                                  455/418
2014/0079217 A1    3/2014  Bai et al.
(Continued)

FOREIGN PATENT DOCUMENTS

DE    102008017946 A1    11/2009
DE    102011112626 A1    3/2013
(Continued)

OTHER PUBLICATIONS

Search Report for International Patent Application No. PCT/EP2016/079501, dated Mar. 1, 2017.

*Primary Examiner* — Mohamed A Kamara
(74) *Attorney, Agent, or Firm* — Barnes & Thornburg LLP

(57) ABSTRACT

Devices, methods and computer programs for establishing a communications link between an information system of a transportation vehicle and a mobile device. The device for an information system of a transportation vehicle for producing a communications link to a mobile device includes a communications module and a control module. The control module controls the communications module, receives information about a hardware address of the mobile device, detects the hardware address of the mobile device via the
(Continued)

communications module based on the information about the hardware address, initiates the pairing of the mobile device with the information system based on the hardware address of the mobile device and establishes the communication link to the mobile device based on the pairing.

15 Claims, 9 Drawing Sheets

(51) Int. Cl.
  *H04W 76/10* (2018.01)
  *H04W 8/00* (2009.01)
  *H04L 29/08* (2006.01)
  *H04W 76/14* (2018.01)
  *H04W 4/40* (2018.01)

(52) U.S. Cl.
  CPC .......... *H04W 8/005* (2013.01); *H04W 76/14* (2018.02); *H04W 84/18* (2013.01)

(58) Field of Classification Search
  CPC .... H04W 12/06; H04W 12/04; H04L 63/083; H04L 63/06
  See application file for complete search history.

(56) References Cited

U.S. PATENT DOCUMENTS

| | | |
|---|---|---|
| 2014/0194056 A1 | 7/2014 | Barrett et al. |
| 2014/0227979 A1 | 8/2014 | Maihoefer |
| 2014/0281470 A1* | 9/2014 | Detter ................ G06F 9/44 713/100 |
| 2015/0024688 A1* | 1/2015 | Hrabak ............... H04W 4/046 455/41.2 |
| 2015/0266452 A1 | 9/2015 | Choi |
| 2016/0057564 A1* | 2/2016 | Sim .................... H04W 4/80 455/41.2 |
| 2016/0150588 A1* | 5/2016 | Yae .................... H04L 67/12 455/41.2 |

FOREIGN PATENT DOCUMENTS

| | | |
|---|---|---|
| DE | 102012012565 A1 | 12/2013 |
| DE | 202015102253 U1 | 6/2015 |
| KR | 20140061080 A | 5/2014 |
| KR | 101519288 B1 | 5/2015 |
| WO | 2012170254 A1 | 12/2012 |

* cited by examiner

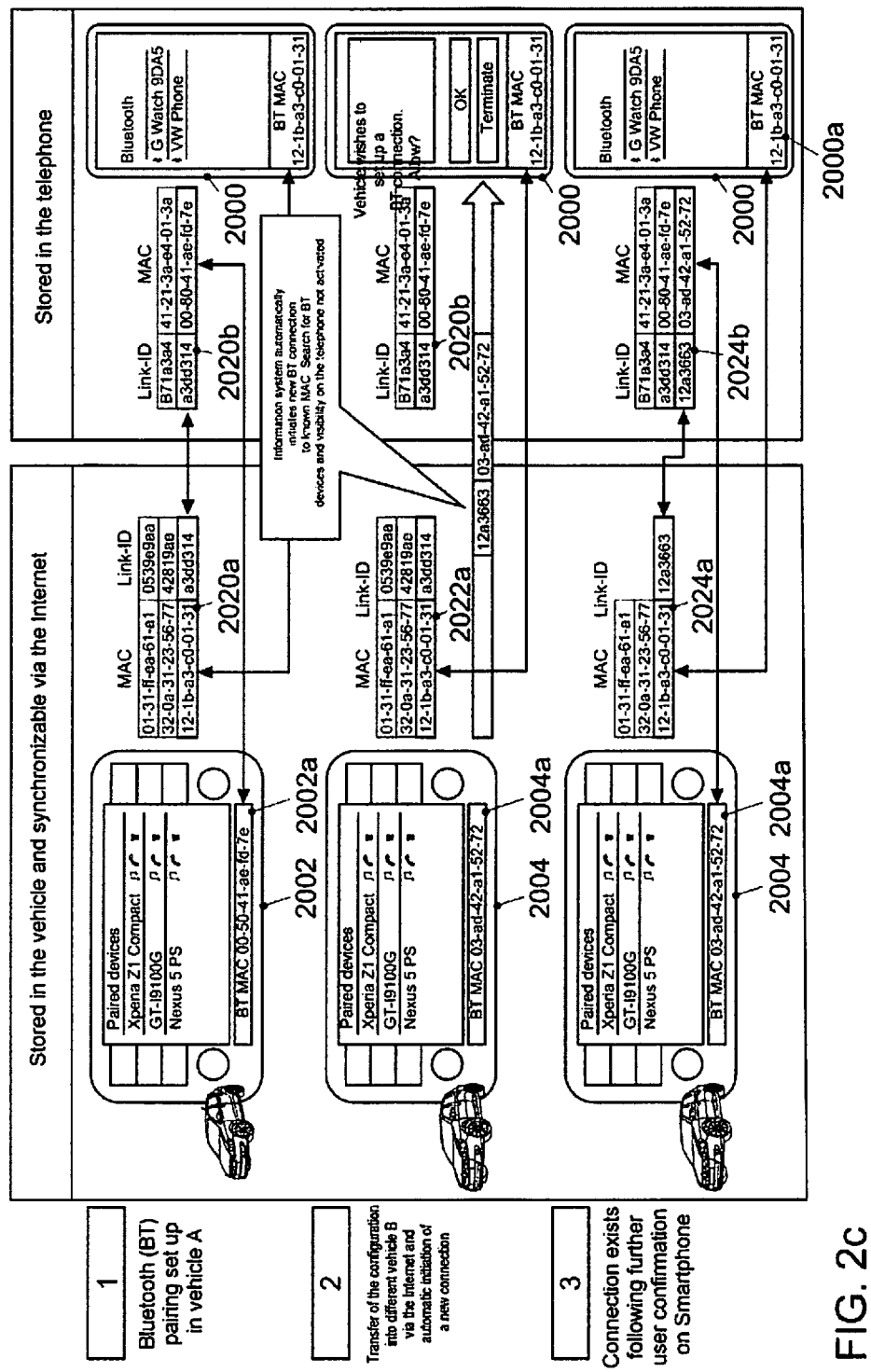

ial Patent Application No. PCT/EP2016/079501, filed
DEVICES, METHODS AND COMPUTER PROGRAM FOR PRODUCING A COMMUNICATION LINK BETWEEN AN INFORMATION SYSTEM OF A TRANSPORTATION VEHICLE AND A MOBILE DEVICE

PRIORITY CLAIM

This patent application is a U.S. National Phase of International Patent Application No. PCT/EP2016/079501, filed 1 Dec. 2016, which claims priority to German Patent Application No. 10 2015 226 643.5, filed 23 Dec. 2015, the disclosures of which are incorporated herein by reference in their entireties.

SUMMARY

Illustrative embodiments relate to devices, methods and computer programs for setting up a communication connection between an information system of a transportation vehicle and a mobile device, more specifically, but not exclusively, on the basis of a hardware address of the mobile device.

BRIEF DESCRIPTION OF THE DRAWINGS

Disclosed embodiments are described in detail below with reference to the drawings, but with no general restriction being applied to the example embodiments. In the figures:

FIG. 2c shows an example embodiment for transmitting information relating to hardware addresses between transportation vehicles;

DETAILED DESCRIPTION

Figure 1:
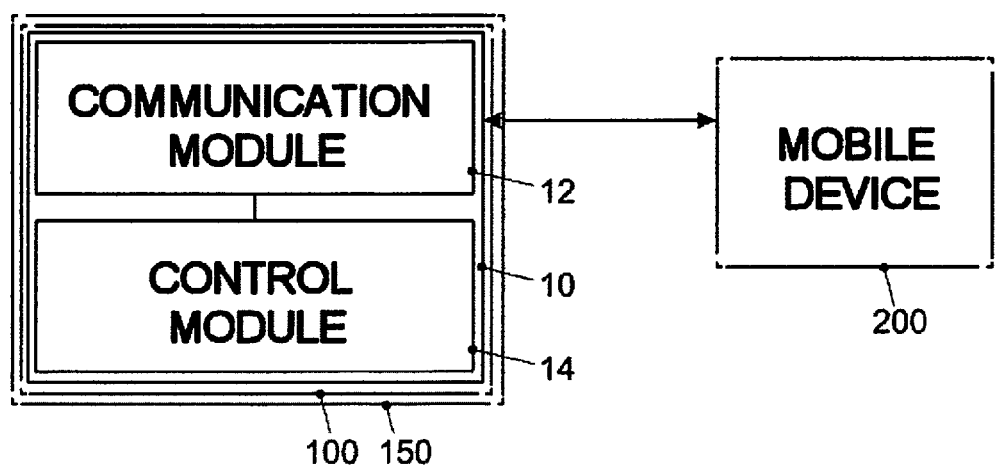
FIG. 1 shows a block diagram of an example embodiment of a device for an information system of a transportation vehicle for setting up a communication connection to a mobile device.

A connection between mobile devices and information systems of transportation vehicles is a significant trend in transportation vehicle manufacture. Functions of the mobile device, such as the presentation of navigation information or the playing of music or other media, can be transferred onto a display screen or a loudspeaker system of the transportation vehicle. The mobile device can simultaneously provide the transportation vehicle with a, possibly broadband, Internet connection.

For many potential users, the setting up of a connection between the mobile device and the information system is an obstacle which can impede the use of the connection. A cable-based connection can usually be set up with ease, since no additional actions are required on the part of the user. However, the setting up of a wireless connection, for example, via BLUETOOTH® or a wireless local access network (WLAN), requires an active pairing of the devices, which in many cases comprises a series of operations.

A need exists to provide an improved concept for setting up a connection between a mobile device and an information system of a transportation vehicle. This need is taken into account by devices and methods according to the independent claims.

Example embodiments can achieve this by a transfer/synchronization of hardware addresses of the mobile devices to/with one or more transportation vehicles. If an information system of a transportation vehicle discovers a mobile device whose address is known, but which is currently not yet paired with the information system, it initiates a pairing of the transportation vehicle with the mobile device, for example, without the need for a further user interaction. The user or a mobile application (app for short) for mobile devices can then confirm the pairing on the mobile device.

Example embodiments provide a device for an information system of a transportation vehicle for setting up a communication connection to a mobile device. The device comprises a communication module and a control module. The control module is configured to control the communication module. The control module is furthermore configured to receive information relating to a hardware address of the mobile device. The control module is furthermore configured to detect the hardware address of the mobile device via the communication module on the basis of the information relating to the hardware address. The control module is furthermore configured to initiate a pairing of the mobile device with the information system on the basis of the hardware address of the mobile device. The control module is furthermore configured to set up the communication connection to the mobile device on the basis of the pairing. The setting up of the communication connection on the basis of the hardware address can simplify a pairing process and enable a simplified use of the mobile device involving a plurality of transportation vehicles.

In at least some example embodiments, the communication module can comprise at least two transceiver modules. The reception of the information relating to the hardware address and the communication connection to the mobile device can be based on different transceiver modules of the at least two transceiver modules. By a transmission of the information relating to the hardware address via a transmit module which differs from the transmit module used to set up the communication connection, a transmission of the information relating to the hardware address can be enabled independently from the mobile device, for example, via an Internet connection of the transportation vehicle.

In some example embodiments, the communication module is configured to communicate in a network. The control module can be configured to receive the information relating to the hardware address from a server in the network. The transmission of the information relating to the hardware address via a server can enable an asynchronous transmission of the information relating to the hardware address and/or an accumulation of hardware addresses in the server.

In at least some example embodiments, the control module is configured to receive the information relating to the hardware address from a further transportation vehicle via the server. A reception of the information relating to the hardware address from a further transportation vehicle enables a simplified connection set-up involving a plurality of transportation vehicles.

In some example embodiments, the control module is configured to receive the information relating to the hardware address from the mobile device via the server. This enables a simplified pairing, e.g., through transmission of the hardware address by an app of the transportation vehicle manufacturer for a simplified pairing.

In at least some example embodiments, the control module is configured to determine information relating to one or more hardware addresses from mobile devices paired with the information system and to provide the information to the server. A provision of the information relating to the one or more hardware addresses from a further transportation vehicle enables a simplified connection set-up involving a plurality of transportation vehicles.

In at least some example embodiments, the hardware address corresponds to a Wireless Local Access Network, WLAN, Medium Access Control, MAC, address or a BLUETOOTH® MAC address. This enables a simplified pairing via BLUETOOTH® or WLAN.

In some example embodiments, the communication module is configured to communicate with the mobile device via a communication protocol. The control module can be configured to initiate the pairing if the communication module has not set up a communication connection with a further mobile device via the communication protocol. A setting up of the communication connection if the communication module has not currently set up a communication connection to any other mobile device can enable the connection in each case of a mobile device.

In some example embodiments, the control module is configured to determine, on the basis of the information relating to the hardware address, whether the information system is paired with the mobile device. The control module can be configured to initiate the pairing on the basis of whether the information system is paired with the mobile device. If a pairing already exists, the control module can set up the communication connection, otherwise the control module can be configured to initiate the pairing and, for example, exchange communication keys.

In at least some example embodiments, the control module is configured to receive information relating to one or more hardware addresses. The hardware address of the mobile device can be comprised in the information relating to the one or more hardware addresses. The control module can be configured to detect the hardware address of the mobile device on the basis of the information relating to the one or more hardware addresses. The detection can enable an initiation of a pairing and/or a connection set-up.

Example embodiments furthermore provide a device for a server in a network for providing information relating to a hardware address of a mobile device for a transportation vehicle. The device comprises a communication module and a control module. The control module is configured to receive the information relating to the hardware address of the mobile device from the mobile device or from a further transportation vehicle via the communication module. The control module is furthermore configured to store the information relating to the hardware address in a memory module. The control module is furthermore configured to provide the information relating to the hardware address of the mobile device for the transportation vehicle via the communication module. The provision of the information relating to the hardware address enables a simplified pairing of an information system of a transportation vehicle with a mobile device, on the basis of the hardware address of the latter.

In some example embodiments, the control module is configured to receive information relating to one or more hardware addresses of one or more mobile devices from the one or more mobile devices and/or from the further transportation vehicle. The information relating to the one or more hardware addresses can comprise the hardware address of the mobile device. The control module can be configured to store the information relating to the one or more hardware addresses in the memory module. The control module can be configured to provide the information relating to the one or more hardware addresses to the transportation vehicle. A provision of the information relating to the one or more hardware addresses from a further transportation vehicle enables a simplified connection set-up involving a plurality of transportation vehicles.

Example embodiments furthermore provide a device for a mobile device for providing information relating to a hardware address of the mobile device for an information system of a transportation vehicle via a server in a network. The device comprises a communication module and a control module. The control module is configured to determine the information relating to the hardware address on the basis of the hardware address of the mobile device. The control module is furthermore configured to provide the information relating to the hardware address for the server via the communication module. A provision of the information relating to the hardware address enables a simplified connection set-up, for example, by a transportation vehicle.

Example embodiments furthermore provide a method for an information system of a transportation vehicle for setting up a communication connection to a mobile device. The method comprises receiving information relating to a hardware address of the mobile device. The method furthermore comprises detecting the hardware address of the mobile device on the basis of the information relating to the hardware address. The method furthermore comprises initiating a pairing of the mobile device 200 with the information system on the basis of the hardware address of the mobile device. The method furthermore comprises setting up the communication connection to the mobile device on the basis of the pairing.

Example embodiments furthermore provide a method for a server in a network for providing information relating to a hardware address of a mobile device for a transportation vehicle. The method comprises receiving the information relating to the hardware address of the mobile device from the mobile device or from a further transportation vehicle. The method furthermore comprises storing the information relating to the hardware address. The method furthermore comprises providing the information relating to the hardware address of the mobile device for the transportation vehicle.

Example embodiments furthermore provide a method for a mobile device for providing information relating to a hardware address of the mobile device for an information system of a transportation vehicle via a server in a network. The method comprises determining the information relating to the hardware address on the basis of the hardware address of the mobile device. The method furthermore comprises providing the information relating to the hardware address for the server.

Example embodiments furthermore provide a program with a program code for carrying out at least one of the methods if the program code is executed on a computer, a processor, a control module or a programmable hardware component.

Different example embodiments will now be described in detail with reference to the attached drawings, in which some example embodiments are shown. The thickness dimensions of lines, layers and/or regions may be shown in exaggerated form in the figures in the interests of clarity.

In the following description of the attached figures which merely show some typical example embodiments, the same reference numbers may denote the same or comparable components. Summarizing reference numbers may furthermore be used for components and objects which occur multiple times in at least one example embodiment or in one drawing, but are described jointly in respect of one or more features. Components or objects which are described with the same or summarizing reference numbers may be designed similarly in respect of individual, a plurality of, or all features, for example, their dimensioning, but, where appropriate, may also be designed differently, unless otherwise indicated, explicitly or implicitly, in the description.

Although example embodiments can be modified and changed in different ways, example embodiments are shown as examples in the figures and are described in detail herein. However, it should be made clear that there is no intention to restrict example embodiments to the respectively disclosed forms, but rather that example embodiments are intended to cover all functional and structural modifications, equivalents and alternatives which fall within the scope of the disclosure. The same reference numbers designate the same or similar elements in the entire description of the figures.

It should be noted that an element which is designated as "connected" or "paired" to another element can be directly connected or paired to the other element or intermediate elements can be present. Conversely, if an element is designated as "directly connected" or "directly paired" to another element, no intermediate elements are present. Other terms that are used to describe the relationship between elements should be interpreted in a similar manner (e.g., "between" as opposed to "directly between", "adjacent" as opposed to "directly adjacent", etc.).

The terminology that is used herein serves merely for the description of specific example embodiments and is not intended to restrict the example embodiments. As used herein, the singular forms "a", "one" and "the" are intended to include the plural forms, unless the context clearly indicates otherwise. Furthermore, it should be made clear that the expressions such as "contains", "containing", "has", "comprises", "comprising" and/or "having", as used herein, indicate the presence of specified features, integers, operations, sequences of operations, elements and/or components, but do not exclude the presence or the addition of one or more features, integers, operations, sequences of operations, elements, components and/or groups thereof.

Unless otherwise defined, all terms used herein (including technical and scientific terms) have the same meaning as ascribed to them by an average person skilled in the art in the field to which the example embodiments belong. It should furthermore be made clear that expressions, e.g., those which are defined in generally used dictionaries, are to be interpreted as having the meaning which is consistent with their meaning in the context of the relevant technology and are not to be interpreted in an idealized or excessively formal sense, unless this is explicitly defined herein.

For many infotainment functions, a pairing is necessary between a telephone and the transportation vehicle or its infotainment system (system for information and entertainment) via technologies such as BLUETOOTH®, e.g., use of the hands-free system, playback of audio files from the telephone via the transportation vehicle loudspeaker, and setting up of the Internet connection for the transportation vehicle via the telephone. The performance of the pairing may require operations from both connection partners. These operating procedures can be complex and can impede a use of some functions of the transportation vehicle.

Furthermore, if the user changes the transportation vehicle (e.g., new transportation vehicle purchase, new company transportation vehicle, car sharing (short-term rental), rental car), the user can reconnect the same telephone to the other transportation vehicle to use it therein. This is complicated, particularly with transportation vehicle usage patterns as in the case of car sharing, since different transportation vehicles are constantly used here by the same customer.

In some example embodiments, similar to the case of Smartphones (programmable mobile telephones) and tablets (mobile computers with a touch-sensitive user interface), the settings of a user can be synchronized in transportation vehicles also via the Internet between transportation vehicles used by him. This enables these settings to be viewed or even modified from outside the transportation vehicle, e.g., via an app on a Smartphone or tablet.

The infrastructure used for this purpose can be used in the example embodiments to further simplify the pairing and to then transfer a pairing, once set up, between a mobile device and a transportation vehicle into different transportation vehicles of the same user, so that no renewed set-up of the pairing is required there.

Conventional systems can use a range of simplifications to simplify a BLUETOOTH® pairing process (e.g., initiation of the pairing via NFC tags, the SSP protocol, etc.). In the case of WLAN connections, access data can similarly be synchronized over a plurality of devices. Although the number of operations for the user for setting up the pairing has been reduced in the past by these solutions (e.g., input of a PIN displayed on the other device no longer necessary), operating actions are nevertheless still required from both connection partners. Thus, the search for connection partners must be initiated on at least one device and the visibility of such a search must be activated on the other device, this frequently being deactivated today for security reasons. Both devices must furthermore be active at the time and must be located within range of one another.

Figure 2A:
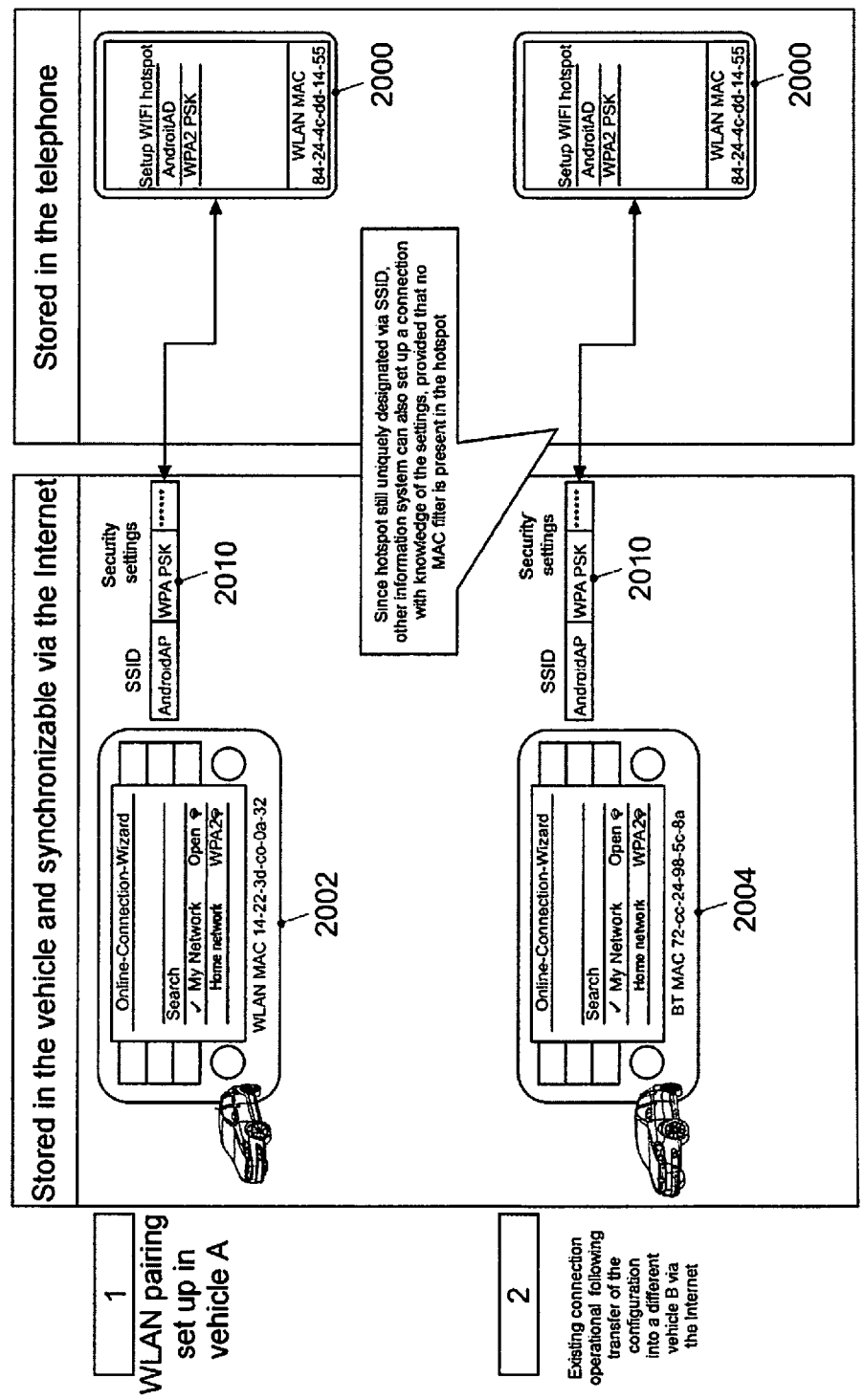
FIG. 2a shows a conventional system for transmitting settings of WLAN access points.

FIG. 2a shows by way of example the operations which can be used in conventional systems to synchronize WLAN access data, for example, for a mobile access point (also referred to as a hotspot) of a Smartphone over a plurality of devices. A Smartphone 2000 can, for example, provide a mobile hotspot, the associated settings being stored in the telephone. These settings 2010 (for example, access data) can be entered in an information system 2002 of a first transportation vehicle and can be synchronized in an information system 2004 of a second transportation vehicle, for example, via the Internet. Since a hotspot is uniquely designated via the SSID, a different information system of a further transportation vehicle with knowledge of the settings 2010 can also is a connection, provided that no medium access control (MAC) address filter of the hotspot prevent this.

Figure 2B:
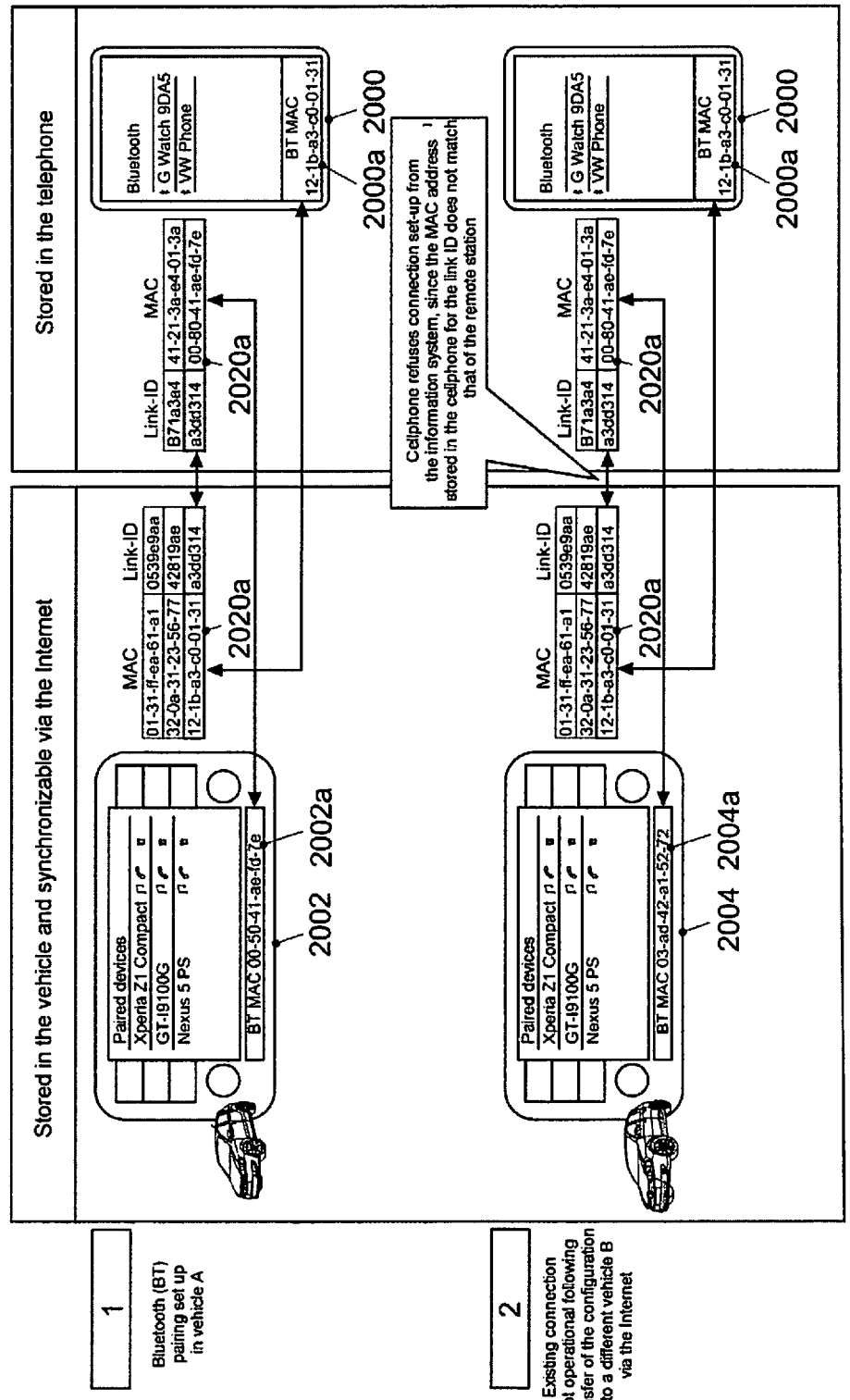
FIG. 2b shows a conventional system for transmitting BLUETOOTH® connections.

The known path for a WLAN connection for transferring the connection settings to a different device of the same user cannot be transferred on BLUETOOTH® connections. FIG. 2b shows an example. The problem here is that, with BLUETOOTH®, both connection partners, for example, an information system 2002 of a first transportation vehicle and a Smartphone 2000, store 2020a, 2020b, 2020c not only the key agreed during the pairing (here referred to as the link ID), but also, for security reasons, the MAC address 2002a; 2002a; 2004a of the remote station. If this pair consisting of the MAC address and the link ID are transferred from one device A (information system 2002 of the first transportation vehicle) to a different device B (information system 2002 of a second transportation vehicle), the remote station 2000 will refuse a communication with the device B 2004 since the MAC address 2002a stored 2020b in the remote station remains that of the device A 2002 for the connection, and not the MAC address 2004a of the device B 2004.

Example embodiments can use a transfer of user settings between transportation vehicles via user accounts on the Internet to thereby transfer data for BLUETOOTH® pairings also. A specific handling of these data in the received device, for example, a control module 14 from FIG. 1, enables pairings which have previously been used by the user with other transportation vehicles to be set up automatically to devices. In some example embodiments, no or reduced user interaction may be required at the remote station, for example, the connection set-up can only be confirmed once, and, in example embodiments, no operating actions could be required on the transportation vehicle side. The pairing process is thereby simplified and the customer can furthermore transfer a pairing, once set up, into further transportation vehicles.

Example embodiments can furthermore enable the control, via an app on the device to be paired, of the pairing of this device with transportation vehicles used by the user without the device having to be located in the vicinity of a transportation vehicle at this time. The device can thus be earmarked for a pairing in future transportation vehicles or, for example, an existing pairing can be released.

FIG. 1 shows a device 10 for an information system 100 of a transportation vehicle 150 for setting up a communication connection to a mobile device 200. The device 10 comprises a communication module 12 and a control module 14. The communication module 12 and a communication module 22 from FIG. 5 can comprise, for example, a BLUETOOTH® communication module or a WLAN communication module or can correspond thereto.

The control module 14 is configured to control the communication module 12. The communication module is furthermore configured to receive information relating to a hardware address of the mobile device 200. The hardware address can correspond, for example, to a WLAN MAC address, a BLUETOOTH® MAC address, or a hardware address of a further short-range radio communication transceiver module.

The control module 14 is furthermore configured to detect the hardware address of the mobile device 200 via the communication module 12 on the basis of the information relating to the hardware address. The control module 14 can be configured, for example, to monitor a frequency range used by the communication module 12 to detect a presence of devices which communicate in this frequency range. The control module 14 can be configured, for example, to receive device availability packets (also referred to as advertisement packets) for the detection, for example, during a pass through a plurality of frequency ranges or channels.

In some example embodiments, the control module 14 can be configured to receive information relating to one or more hardware addresses, wherein the hardware address of the mobile device 200 is comprised in the information relating to the one or more hardware addresses. The control module 14 can be configured to detect the hardware address of the mobile device 200 on the basis of the information relating to the one or more hardware addresses. In one example implementation, the control module 14 can be configured to receive a list, a table or a data structure which comprises the one or more hardware addresses and to carry out the detection on the basis of the one or more hardware addresses.

The control module 14 is furthermore configured to initiate a pairing of the mobile device 200 with the information system 100 on the basis of the hardware address of the mobile device 200. The control module 14 can be configured, for example, to initiate the pairing automatically or without user confirmation on the basis of the hardware address of the mobile device 200. In some example embodiments, the communication module 12 can be configured to communicate with the mobile device 200 via a communication protocol. The control module 14 can be configured to initiate the pairing if the communication module 12 has not set up a communication connection with a further mobile device via the communication protocol. The control module 14 can be configured, for example, to initiate the pairing on the basis of a user action, for example, a switch area for pairing mobile devices which are not paired but are known through the information relating to the hardware address or the information relating to the one or more hardware addresses. The information system could, for example, provide a switch area, for example, a button or a switch area on a touch-sensitive display screen, to initiate a pairing of devices, for example, without selecting the mobile device 200 from a presentation.

The pairing with the mobile device can comprise, for example, an exchange of hardware addresses and/or an exchange of keys or subkeys. The control module 14 can be configured, for example, to store information relating to the pairing for the mobile device 200, for example, identification information of the pairing, for example, a link ID (connection identification), a hardware address of the remote station (of the mobile device 200), and/or key information. The key information can be based, for example, on a key exchange method and an assembled key. In some example embodiments, the pairing can be the prerequisite for setting up a communication connection. If the pairing exists, the control module 14 can be configured to set up the communication connection on detection of the mobile device 200.

In some example embodiments, the control module 14 can be configured, for example, to determine, on the basis of the information relating to the hardware address, whether the information system 100 is paired with the mobile device 200. The control module 14 can be configured to initiate the pairing on the basis of whether the information system 100 is paired with the mobile device 200.

In at least some example embodiments, the pairing can comprise a key exchange and/or an exchange of hardware addresses.

The control module 14 is furthermore configured to set up the communication connection with the mobile device 200 on the basis of the pairing. The control module 14 can be configured, for example, to provide messages for the connection set-up, for example, page messages, and to negotiate the connection set-up with the mobile device 200.

In at least some example embodiments, the communication module 12 can comprise at least two transceiver modules. The reception of the information relating to the hardware address and the communication set-up to the mobile device 200 can be based on different transceiver modules of the at least two transceiver modules. The control module 14 can be configured, for example, to receive the information relating to the hardware address via a transceiver module for a cellular mobile radio communication system and/or a WLAN transceiver module, and to set up the communication connection via a BLUETOOTH® transceiver module.

Figure 1A:
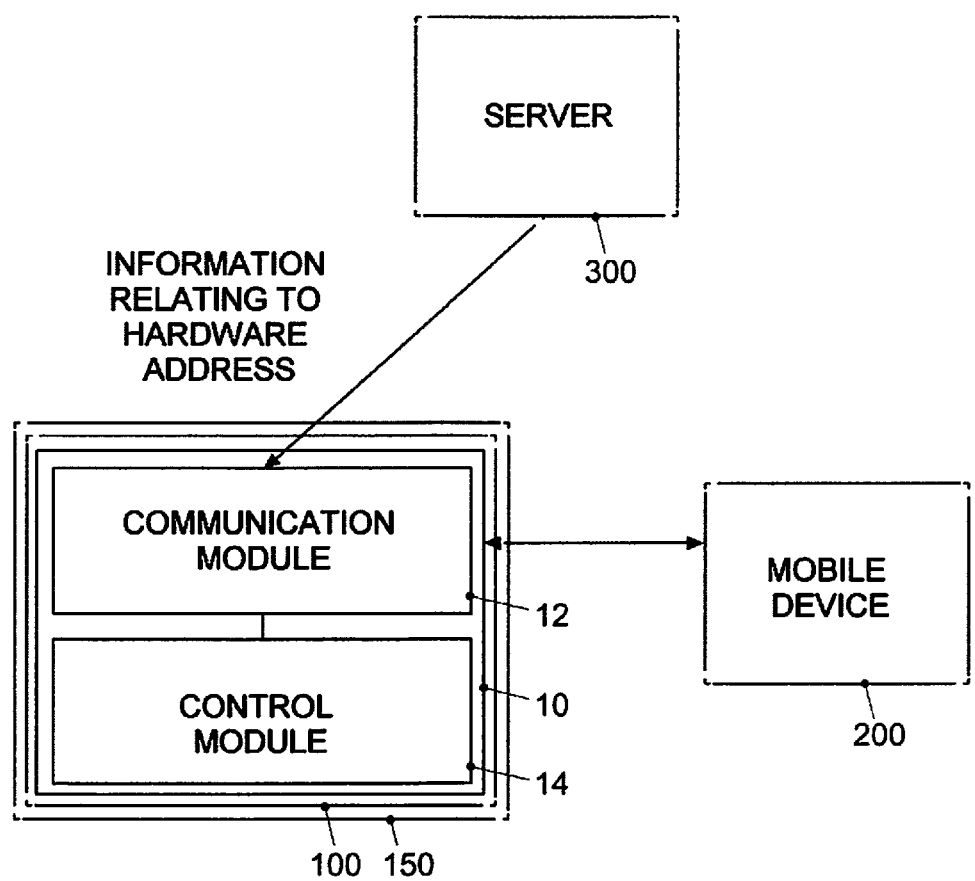
FIG. 1a shows a block diagram of an example embodiment of a device for an information system of a transportation vehicle for setting up a communication connection to a mobile device which furthermore shows a server.

In at least some example embodiments, the communication module 12 can be configured to communicate in a network. The control module 14 can be configured to receive the information relating to the hardware address from a server 300 in the network, as shown in FIG. 1a. FIG. 1a extends FIG. 1 with the addition of the server 300. The network can correspond, for example, to the Internet or a network of a transportation vehicle manufacturer, for example, via a mobile radio communication connection or via a radio communication network of a service facility of the transportation vehicle manufacturer. The server 300 can alternatively correspond to an individual server, a group of servers, a data center, a virtual server instance, a group of virtual server instances or a backend system of a device manufacturer or transportation vehicle manufacturer.

The control module 14 can be configured, for example, to receive the information relating to the hardware address from a further transportation vehicle via the server 300. The control module 14 can be configured, for example, to determine information relating to one or more hardware addresses from mobile devices paired with the information system 100 and to provide the information to the server 300. These can be provided by the server 300 to other transportation vehicles of the user.

Alternatively or additionally, the control module 14 can be configured to receive the information relating to the hardware address from the mobile device 200 via the server 300.

The control module 14 is paired with the communication module. In example embodiments, the control module 14, a control module 24 from FIG. 5 and or a control module 34 from FIG. 4 can correspond to any controller or processor or to a programmable hardware component. The control module 14; 24; 34 can also be implemented, for example, as software which is programmed for a corresponding hardware component. In this respect, the control module 14; 24; 34 can be implemented as programmable hardware with correspondingly adapted software. Any processors, such as digital signal processors (DSPs), can be used. Example embodiments are not restricted to a specific type of processor. Any processors or a plurality of processors are conceivable for the implementation of the control module 14; 24; 34.

Figure 5:
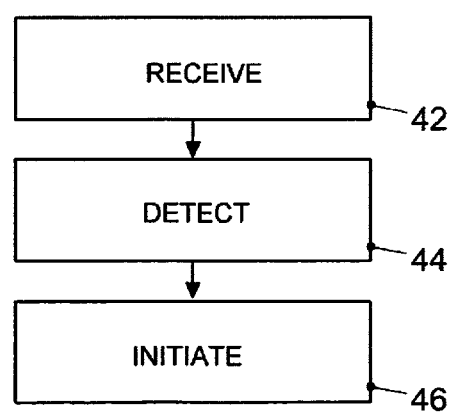
FIG. 5 shows a flow diagram of an example embodiment of a method for an information system of a transportation vehicle for setting up a communication connection to a mobile device.

In at least some example embodiments, the communication module 12, and a communication module 22 from FIG. 5, can be configured to communicate via a mobile radio communication system, for example, via a cellular mobile radio communication system, for example, based on one of the mobile radio communication systems which are standardized by corresponding standardization bodies, such as e.g., the 3rd Generation Partnership Project (3GPP) group. These systems comprise, for example, the Global System for Mobile Communications (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN), such as, e.g., the Universal Mobile Telecommunication system (UMTS), Long Term Evolution (LTE) or LTE-Advanced (LTE-A), or mobile radio communication systems of other standards, such as, e.g., the Worldwide Interoperability for Microwave Access (WIMAX), IEEE802.16 or Wireless Local Area Network (WLAN), IEEE802.11, and generally a system which is based on a Time Division Multiple Access (TDMA) method, Frequency Division Multiple Access (FDMA) method, Code Division Multiple Access (CDMA) method, Orthogonal Frequency Division Multiple Access (OFDMA) method or a different technology or multiple access method. The communication connection can correspond, for example, to a BLUETOOTH®, a WLAN, or a further radio communication data connection.

The information system 100 can correspond, for example, to an on-board information system of the transportation vehicle 150 (also referred to as an On-Board Unit, OBU) or an infotainment system of the transportation vehicle 150, for example, an embedded computer which provides functions for controlling transportation vehicle functions and/or for controlling a transportation vehicle entertainment system. The mobile device 200 can correspond, for example, to a mobile telephone, a programmable mobile telephone, a Smartphone, a tablet computer or a mobile Internet access point (also referred to as a hotspot). In at least some example embodiments, the transportation vehicle 150 can correspond, for example, to a land-based transportation vehicle, a watercraft, an aircraft, a rail transportation vehicle, a road transportation vehicle, a transportation vehicle, an off-road transportation vehicle, a transportation vehicle or a truck.

The communication module 12 is paired with the control module 14. Example embodiments furthermore provide the information system 100 comprising the device 10, and/or the transportation vehicle 150 comprising the information system 100 and the device 10.

FIG. 2c shows a typical example embodiment in which the information relating to the hardware address or the information relating to the one or more hardware addresses 2022a is transmitted on the basis of a list of paired devices 2020a from an information system 2002 of a transportation vehicle with a hardware address 2002a to an information system 2004 of a further transportation vehicle with a hardware address 2004a. The list of paired devices 2020a comprises the hardware addresses and link IDs of the paired devices, inter alia the hardware address 2000a of the mobile device 2000. In example embodiments, the information systems 2004; 2004a can comprise the device 10 and can correspond to the information system 100. The mobile device 2000 can correspond to the mobile device 200.

In at least some example embodiments, the control module 14 is configured to receive the information relating to the hardware address via a suitable mechanism (e.g., via a user account of the transportation vehicle user on the server 300). In at least some example embodiments, the information relating to the hardware address may not comprise the pairs consisting of the link ID and hardware addresses 2020a, but only their hardware addresses 2022a. The control module 14 could furthermore be configured to receive meta information for the hardware address(es) which can comprise, for example, a time of the last use or a frequency of use.

In at least some example embodiments, the control module 14 can be configured to combine the information relating to the hardware address or the information relating to the one or more hardware addresses with a plurality of BLUETOOTH® devices already known in this transportation vehicle for which hardware addresses and/or meta information and, where appropriate, also link IDs may similarly already be present there. The control module 14 can be configured to receive meta information relating to the one or more hardware addresses from the server 300. The control module can be configured to combine entries for already present hardware addresses, i.e., only one entry, for example, can be retained along with the associated link ID (insofar as it is present). Meta information can similarly be suitably combined.

If the transportation vehicle is currently paired with a device via BLUETOOTH®, no further action may be performed in some example embodiments. If not, the control module 14 can be configured to initiate a pairing or a setting up of a connection for the combined plurality of BLUETOOTH® devices in a predefined or random sequence. The control module 14 can be configured to determine the sequence on the basis of the meta information, e.g., according to the time of the last use of the pairing.

If a link ID is already present, the control module 14 can be configured to restore the communication connection. If no link ID is present, the control module 14 can be configured to initiate the pairing. This can have the result that the user can acknowledge this, where appropriate, at the remote station. The control module 14 can be configured to agree a new link ID and store 2024a it locally for this hardware address. The pairing list 2020b of the mobile device 2000 can be adapted 2024b accordingly and the hardware address of the information system 2004 can be incorporated with the link ID.

If the action for the entry fails, the control module 14 can be configured to be continued with the next entry. If the action is successful, the method can be ended. In both cases, the control module 14 can be configured to then update the meta information for the entry.

Figure 3:
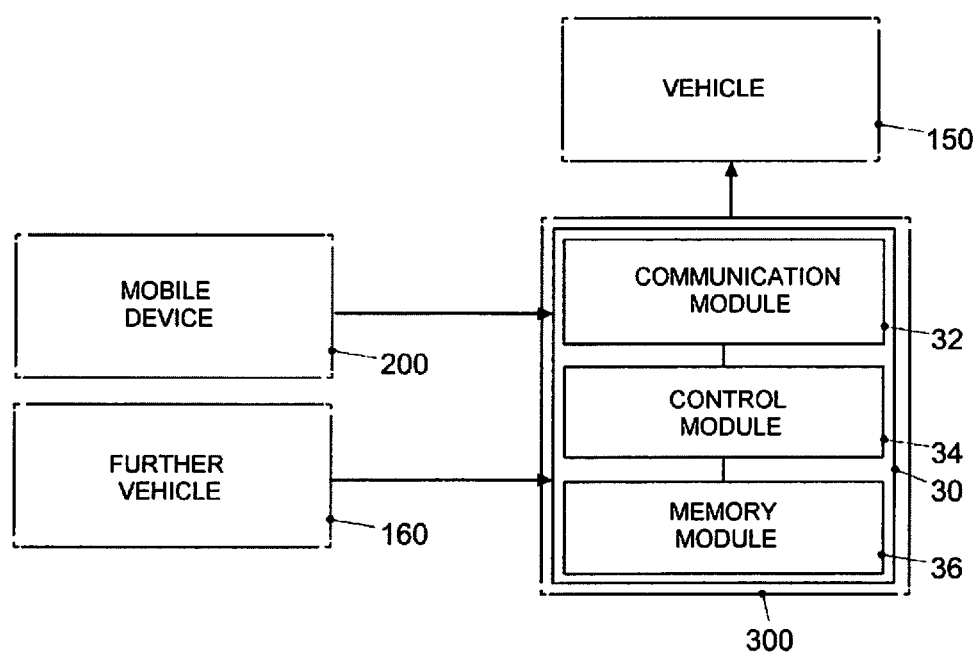
FIG. 3 shows a block diagram of an example embodiment of a device for a server in a network for providing information relating to a hardware address of a mobile device for a transportation vehicle.

FIG. 3 shows a block diagram of an example embodiment of a device 30 for a server 300 in a network for providing information relating to a hardware address of a mobile device 200 for a transportation vehicle 150. The device 30 comprises a communication module 32 and the control module 34. The communication module 32 can be configured, for example, to communicate with the transportation vehicle 150, the mobile device 150 and or a further transportation vehicle 160 via the Internet or via a transportation vehicle-specific network. The communication module 32 can be configured, for example, to use a plurality of transport media, for example, based on wireless and wired route sections. The communication module 32 can comprise, for example, an Ethernet and/or an optical transceiver module.

The control module 34 is configured to receive the information relating to the hardware address of the mobile device 200 or from the mobile device 200 or from the further transportation vehicle 160 via the communication module 32. The control module 34 is configured to store the information relating to the hardware address in a memory module 36. The memory module can comprise, for example, at least one element from the group consisting of a computer-readable storage medium, magnetic storage medium, optical storage medium, hard disk, flash memory, diskette, Random Access Memory (RAM), Programmable Read Only Memory (PROM), Erasable Programmable Read Only Memory (EPROM), Electronically Erasable Programmable Read Only Memory (EEPROM), and network memory.

The control module 34 is furthermore configured to provide the information relating to the hardware address of the mobile device 200 for the transportation vehicle 150 via the communication module 32. The control module 34 can be configured, for example, to provide the information relating to the hardware address as a data message, for example, based on a query of the transportation vehicle 150 or based on a distribution (broadcast).

In some example embodiments, the control module 34 is configured to receive information relating to one or more hardware addresses from one or more mobile devices from the one or more mobile devices and/or from the further transportation vehicle 160. The information relating to the one or more hardware addresses can comprise the hardware address of the mobile device 200. The control module 34 can be configured to store the information relating to the one or more hardware addresses in the memory module 36. The control module 34 can be configured to provide the information relating to the one or more hardware addresses to the transportation vehicle 150. The control module 34 can be configured, for example, to receive information relating to a use of the one or more hardware addresses. The control module 34 can be configured, for example, to provide the information relating to the one or more hardware addresses on the basis of the information relating to the use of the one or more hardware addresses, for example, on the basis of a last use or frequency of use of the one or more hardware addresses.

The control module 34 can be configured, for example, to provide meta information relating to the one or more hardware addresses to the transportation vehicle 150. The meta information can comprise, for example, the information relating to the use.

The control module is paired with the communication module 32 and with the memory module 36. The device 30 can comprise the memory module 36. Example embodiments furthermore provide the server 300 comprising the device 30.

More details and properties of the device 30 (e.g., information system 100, transportation vehicle 150, mobile device 200, server 300, hardware address) will be specified in connection with the concept or examples which have previously been described (e.g., FIGS. 1 to 2). The device 30 can comprise one or more additional optional features which correspond to one or more properties of the proposed concept or the described examples, as described above or below.

Figure 4:
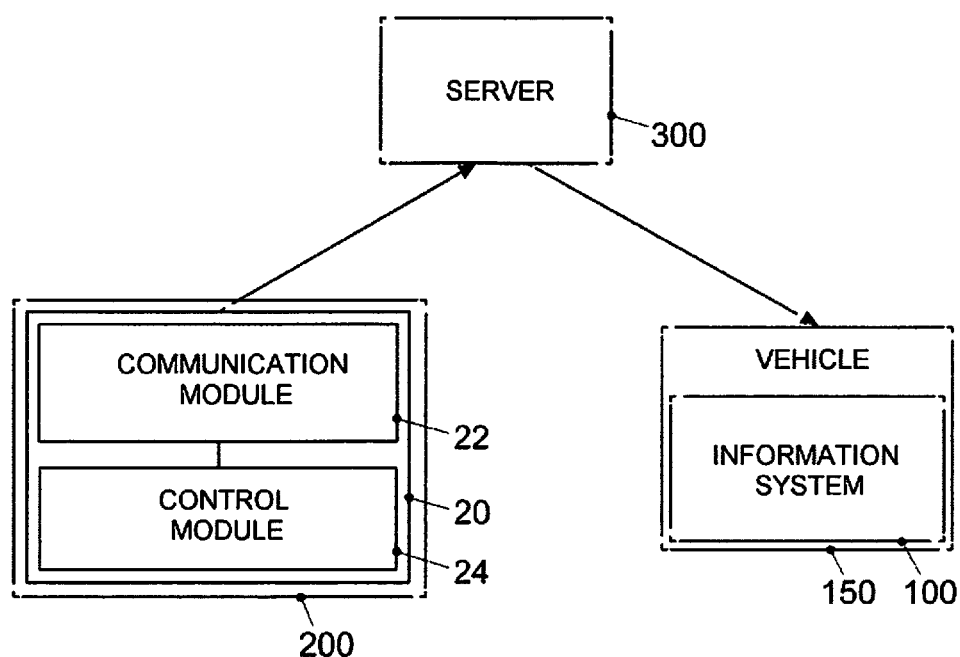
FIG. 4 shows a block diagram of an example embodiment of a device for a mobile device for providing information relating to a hardware address of the mobile device for an information system of a transportation vehicle via a server in a network.

FIG. 4 shows a block diagram of an example embodiment of a device 20 for a mobile device 200 for providing information relating to a hardware address of the mobile device 200 for an information system 100 of a transportation vehicle 150 via a server 300 in a network. The device comprises a communication module 22 and a control module 24. The control module 24 is paired with the communication module 22. Example embodiments furthermore provide the mobile device 200 comprising the device 20.

The communication module 22 can comprise, for example, two or more transceiver modules. A transceiver module can be configured, for example, for the communication to communicate via a cellular mobile radio communication network, to communicate with the server 300. A further transceiver module can be configured to communicate with the information system 100, for example, via a short-range radio communication system, for example, BLUETOOTH®.

The control module 24 is configured to determine the information relating to the hardware address on the basis of the hardware address of the mobile device 200. The control module 24 can be configured, for example, to determine the information relating to the hardware address on the basis of a program interface or on the basis of an information resource of an operating system of the mobile device. In some example embodiments, the control module 24 can be configured to provide one or more hardware addresses of devices which are paired with the mobile device 200 and are known to the latter, and/or hardware addresses of transceiver modules of the mobile device 200, as information relating to one or more hardware addresses.

The control module 24 is furthermore configured to provide the information relating to the hardware address for the server via the communication module 22. The control module 24 can be configured, for example, to provide the information relating to the hardware address to the information system 100 via the server 300.

In some example embodiments 24, the control module 24 is furthermore configured to confirm a pairing of the mobile device 200 with the information system 100, for example, via a user query via a user interface or without user interaction.

More details and properties of the device 20 (e.g., information system 100, transportation vehicle 150, mobile device 200, server 300, hardware address) will be specified in connection with the concept or examples which have previously been described (e.g., FIGS. 1 to 3). The device 20 can comprise one or more additional optional features which correspond to one or more properties of the proposed concept or the described examples, as described above or below.

Figure 2D:
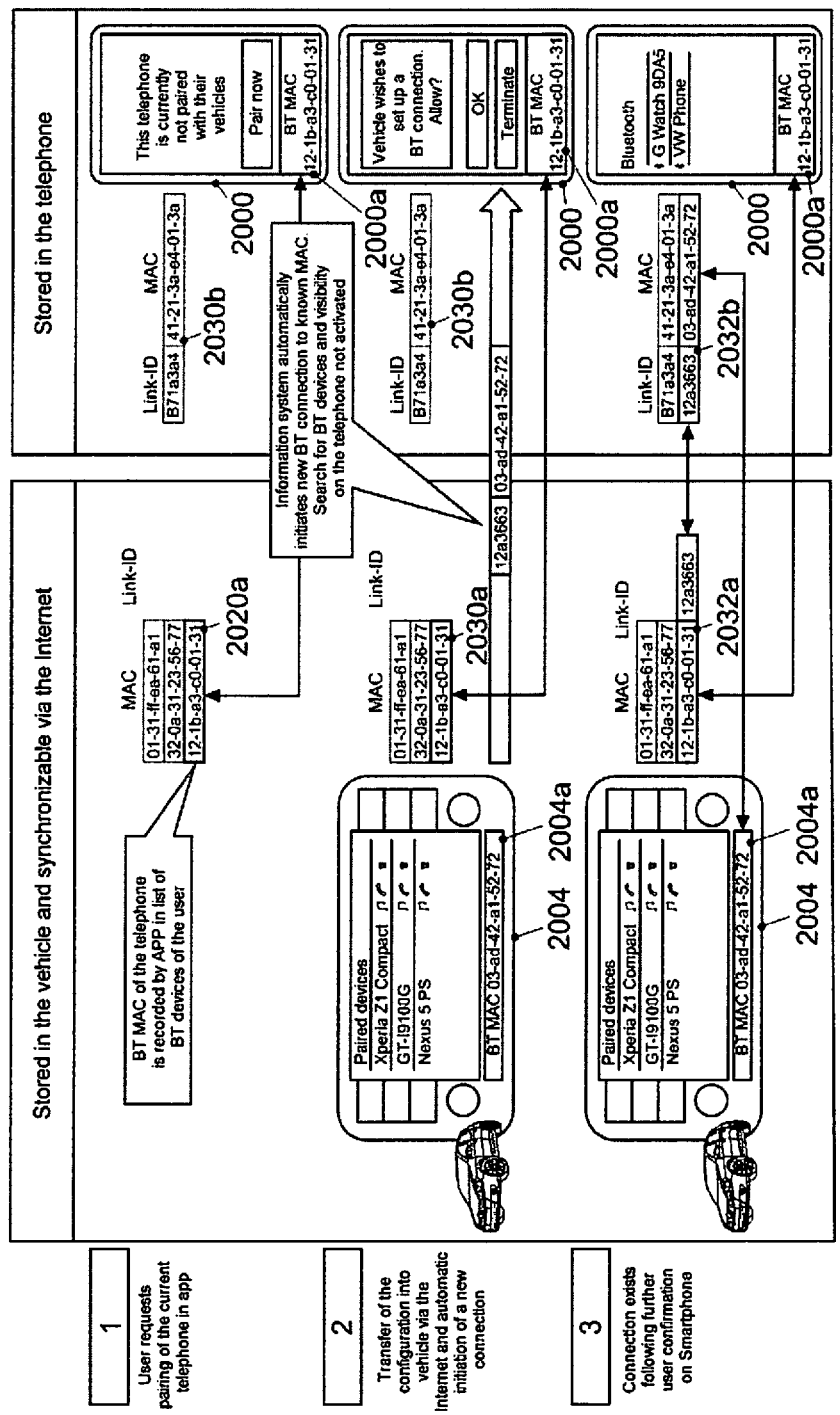
FIG. 2d shows an example embodiment for transmitting information relating to a hardware address of a mobile device to an information system of a transportation vehicle.

FIG. 2d shows an example embodiment for the provision of the information relating to the hardware address by a mobile device 2000 which can correspond, for example, to the mobile device 200. In some example embodiments, the device 20, for example, as a computer program for a mobile device, can provide a facility for simplified pairing which can be used in some example embodiments from any locations, for example, remotely from the transportation vehicle 2004 which can correspond to the transportation vehicle 150.

The control module 24 can be configured, for example, to retrieve the one or more hardware addresses 2030a of the pairing devices of the user from a server, for example, the server 300 (e.g., by accessing the settings in the latter's user account via the Internet), and can be configured to search therein for the hardware address 2000a, for example, the BLUETOOTH® MAC address of the mobile device 2000.

If the address is not present, the control module 24 can be configured to indicate to the user that the device is not connected in his transportation vehicles. He can be offered the facility to set up a pairing with this device automatically in future and to insert the hardware address 2000a into a list 2030a of the one or more hardware addresses for this purpose (where appropriate, corresponding meta information is written here, effecting a high-priority attempt to pair with this device). The control module 24 can be configured to provide the information relating to the hardware address and/or meta information to the information system 2004 via the server. If the list is then transferred into the transportation vehicle 2004, the transportation vehicle can attempt to set up a new pairing with this device, for example, by the control module 14. The control module 24 can be configured to transfer the hardware address 2004a into a list 2030b of pairing devices of the mobile device 200 on the basis of the pairing and to supplement a list 2032a of pairing devices of the transportation vehicle 2004, which can be based on the information relating to the one or more hardware addresses 2030a, with the corresponding link ID.

Conversely, if the hardware address is already present in the one or more hardware addresses, it can be indicated to the user that this device is connected in his transportation vehicles. The control module 24 can be configured to remove the hardware address of the mobile device 2000 from the information relating to the one or more hardware addresses 2030a on the basis of a user interaction. The control module 34 can be configured to provide the removal of the hardware address to the control module 14, and the control module 14 can be configured to remove the hardware address from the stored one or more hardware addresses. The control module 14 can be configured to terminate a connection to this device already existing, where appropriate, at this time on the basis of the removal. Alternatively, instead of removing the entry for deletion from the list, its meta data can also be marked as deleted.

In some example embodiments, the control module 14 can be configured to store the information relating to the hardware address or the information relating to the one or more hardware addresses on a mobile memory module, for example, on a portable flash memory or data card. The communication module 12 can comprise, for example, a module for writing to and/or reading from mobile memory modules. In some example embodiments, the control module 14 can be configured to receive the information relating to the hardware address or the information relating to the one or more hardware addresses from the mobile device 200 via a short-range radio communication connection, for example, via Near Field Communication (NFC), or via connectionless BLUETOOTH®.

Example embodiments furthermore provide a device for a mobile device for setting up a communication connection to the mobile device 200 which is implemented in a similar manner to the device 10. Example embodiments furthermore provide a device for a computer for setting up a communication connection to the mobile device 200 which is implemented in a similar manner to the device 10. In some example embodiments, the device 20 can be configured, in a manner similar to the provision of the information relating to the hardware address of the mobile device for the information system of the transportation vehicle, to provide the information relating to the hardware address to a further mobile device or a computer. Similarly, the device 30 can be configured to provide the information relating to the hardware address to a mobile device or a computer.

FIG. 5 shows a flow diagram of an example embodiment of a method for an information system 100 of a transportation vehicle 150 for setting up a communication connection to a mobile device 200. The method comprises receiving 42 information relating to a hardware address of the mobile device 200. The method furthermore comprises detecting 44 the hardware address of the mobile device 200 on the basis of the information relating to the hardware address. The method furthermore comprises initiating 46 a pairing of the mobile device 200 with the information system 100 on the basis of the hardware address of the mobile device 200. The method furthermore comprises setting up 48 the communication connection to the mobile device 200 on the basis of the pairing.

Figure 6:
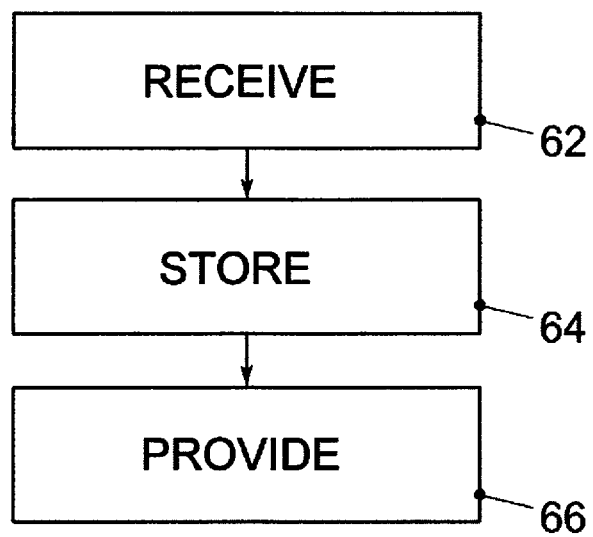
FIG. 6 shows a flow diagram of an example embodiment of a method for a server in a network for providing information relating to a hardware address of a mobile device for a transportation vehicle.

FIG. 6 shows a flow diagram of an example embodiment of a method for a server 300 in a network for providing information relating to a hardware address of a mobile device 200 for a transportation vehicle 150. The method comprises receiving 62 the information relating to the hardware address of the mobile device 200 from the mobile device 200 or from a further transportation vehicle 160. The method furthermore comprises storing 64 the information relating to the hardware address. The method furthermore comprises providing 66 the information relating to the hardware address of the mobile device 200 for the transportation vehicle 150.

Figure 7:
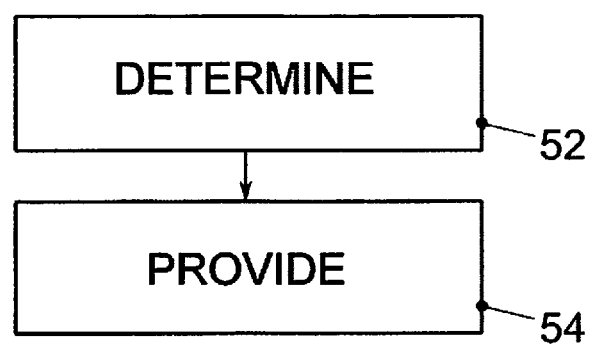
FIG. 7 shows a flow diagram of an example embodiment of a method for a mobile device for providing information relating to a hardware address of the mobile device for an information system of transportation a vehicle via a server in a network.

FIG. 7 shows a flow diagram of an example embodiment of a method for a mobile device 200 for providing information relating to a hardware address of the mobile device 200 for an information system 100 of a transportation vehicle 150 via a server 300 in a network. The method comprises determining 52 the information relating to the hardware address on the basis of the hardware address of the mobile device 200. The method furthermore comprises providing 54 the information relating to the hardware address for the server.

A further example embodiment is a computer program to carry out at least one of the methods described above if the computer program runs on a computer, a processor, or a programmable hardware component. A further example embodiment is also a digital storage medium which is machine-readable or computer-readable and which has electronically readable control signals which can interwork with a programmable hardware component in such a way that one of the methods described above is carried out.

The features disclosed in the preceding description, the following claims and the attached figures can be significant and can be implemented in their various designs both individually and in any combination for the realization of an example embodiment.

Although some properties have been described in connection with a device, these properties obviously represent a description of the corresponding method also, so that a block or a component of a device is also to be understood as a corresponding method operation or as a feature of a method operation. Similarly, properties which have been described in connection with or as a method operation also represent a description of a corresponding block or detail or feature of a corresponding device.

Depending on specific implementation requirements, example embodiments can be implemented in hardware or in software. The implementation can be performed using a digital storage medium, for example, a floppy disk, a DVD, a Blu-Ray disc, a CD, a ROM, a PROM, an EPROM, an EEPROM or FLASH memory, a hard disk or other magnetic or optical memory on which electronically readable control signals are stored which can interwork or do interwork with a programmable hardware component in such a way that the respective method is carried out.

A programmable hardware component can be formed by a processor, a Central Processing Unit (CPU), a Graphics Processing Unit (GPU), a computer, a computer system, an Application-Specific Integrated Circuit (ASIC), an Integrated Circuit (IC), a System On Chip (SOC), a programmable logic element or a Field Programmable Gate Array (FPGA) with a microprocessor.

The digital storage medium can therefore be machine-readable or computer-readable. Some example embodiments therefore comprise a data medium which has electronically readable control signals which are capable of interworking with a programmable computer system or a programmable hardware component in such a way that one of the methods described herein is carried out. At least one example embodiment is therefore a data medium (or a digital storage medium or a computer-readable medium) on which the program to carry out one of the methods described herein is recorded.

Example embodiments can generally be implemented as a program, firmware, computer program or computer program product with a program code or as data, wherein the program code or the data is/are effective in carrying out one of the methods if the program runs on a processor or on a programmable hardware component. The program code or the data can, for example, also be stored on a machine-readable medium or data medium. The program code or the data can be present, inter alia, as source code, machine code or byte code and as other intermediate code.

A further example embodiment is moreover a data stream, a signal sequence or a succession of signals which represent(s) the program to carry out one of the methods described herein. The data stream, the signal sequence or the succession of signals can be configured, for example, to be transferred via a data communication connection, for example, via the Internet or a different network. Example embodiments are therefore also signal sequences representing data which are suitable for a transmission via a network or a data communication connection, wherein the data represent the program.

A program according to at least one example embodiment can implement one of the methods during its execution, for example, by reading memory locations or writing a datum or a plurality of data thereto, whereby, where appropriate, switching procedures or other procedures are invoked in transistor structures, in amplifier structures or in other electrical, optical, magnetic components or components operating according to a different functional principle. Data, values, sensor values or other information can be captured, determined or measured accordingly by a program by reading from a memory location. A program can therefore capture quantities, values, measured quantities and other information by reading from one or more memory locations and can effect, instigate or perform an action and control other devices, machines and components by writing to one or more memory locations.

The example embodiments described above merely represent an illustration of the principles of the present disclosure. Modifications and variations of the arrangements and details described herein will of course be apparent to other persons skilled in the art. The disclosure is therefore intended to be restricted only by the protective scope of the patent claims set out below and not by the specific details that have been presented herein by way of the description and the explanation of the example embodiments.

REFERENCE NUMBER LIST

10 Device for an information system of a transportation vehicle
12 Communication module
14 Control module
20 Device for a mobile device
22 Communication module
24 Control module
30 Device for a server in a network
32 Communication module
34 Control module
36 Memory module
42 Receive 44 Detect
46 Initiate
48 Set up
52 Determine
54 Provide
62 Receive
64 Store
66 Provide
100 Information system
150 Transportation vehicle
200 Mobile device
300 Server
2000 Mobile device
2000a Hardware address of the mobile device
2002 Information system of a transportation vehicle
2002a Hardware address of the information system of the transportation vehicle
2004 Information system of a transportation vehicle
2004a Hardware address of the information system of the transportation vehicle
2010 Settings
2020a One or more hardware addresses and link IDs of the information system of the transportation vehicle
2020b Pairing devices of the mobile device
2022a One or more hardware addresses
2024a One or more hardware addresses with stored Link ID for pairing with mobile device
2024b Updated pairing devices of the mobile device
2030a One or more hardware addresses
2030a Pairing devices of the mobile device
2032a One or more hardware addresses with stored link ID for pairing with mobile device
2032b Updated pairing devices of the mobile device

The invention claimed is:

1. A device for an information system of a transportation vehicle for setting up a communication connection to a mobile device, the method comprising:
a communication module; and
a control module, wherein the control module:
controls the communication module,
receives information relating to a hardware address of the mobile device and meta information relating to the hardware address comprising a time of last use of the mobile device,
detects the hardware address of the mobile device via the communication module based on the information relating to the hardware address,
initiates a pairing of the mobile device with the information system based on the hardware address of the mobile device and on the meta information, and
set up the communication connection to the mobile device based on the pairing.

2. The device of claim 1, wherein the communication module comprises at least two transceiver modules, and wherein the reception of the information relating to the hardware address and the communication connection to the mobile device is based on different transceiver modules of the at least two transceiver modules.

3. The device of claim 1, wherein the communication module communicates in a network, and wherein the control module receives the information relating to the hardware address from a server in the network.

4. The device of claim 3,
wherein the control module receives the information relating to the hardware address from a further transportation vehicle via the server,
wherein the control module receives the information relating to the hardware address from the mobile device via the server, and
wherein the control module determines information relating to one or more hardware addresses from mobile devices paired with the information system and provides said information to the server.

5. The device of claim 1, wherein the hardware address corresponds to a Wireless Local Access Network, WLAN, Medium Access Control, MAC, address or a wireless communication protocol MAC address.

6. The device of claim 1, wherein the communication module communicates with the mobile device via a communication protocol, and wherein the control module initiates the pairing in response to the communication module not having set up a communication connection with a further mobile device via the communication protocol.

7. The device of claim 1, wherein the control module determines whether the information system is paired with the mobile device based on the information relating to the hardware address.

8. The device of claim 1, wherein the control module receives information relating to one or more hardware addresses, wherein the hardware address of the mobile device is comprised in the information relating to the one or more hardware addresses, and wherein the control module detects the hardware address of the mobile device based on the information relating to the one or more hardware addresses.

9. A device for a server in a network for providing information relating to a hardware address of a mobile device for a transportation vehicle, the device comprising:
a communication module; and
a control module, wherein the control module:
receives the information relating to the hardware address of the mobile device from the mobile device or from a further transportation vehicle via the communication module and meta information relating to the hardware address comprising a time of last use of the mobile device,
stores the information relating to the hardware address and the meta information in a memory module, and
provides the information relating to the hardware address of the mobile device and the meta information to the transportation vehicle via the communication module.

10. The device of claim 9, wherein the control module receives information relating to one or more hardware addresses of one or more mobile devices from the one or more mobile devices and/or from the further transportation vehicle, wherein the information relating to the one or more hardware addresses comprises the hardware address of the mobile device, wherein the control module stores the information relating to the one or more hardware addresses in the memory module, and wherein the control module provides the information relating to the one or more hardware addresses to the transportation vehicle.

11. A device for a mobile device for providing information relating to a hardware address of the mobile device for an information system of a transportation vehicle via a server in a network, the device comprising:
a communication module; and
a control module, wherein the control module:
determines the information relating to the hardware address based on the hardware address of the mobile device and meta information relating to the hardware address comprising a time of last use of the mobile device, and provides the information relating to the hardware address and the meta information to the server via the communication module.

12. A method for an information system of a transportation vehicle for setting up a communication connection to a mobile device, the method comprising:

receiving information relating to a hardware address of the mobile device and meta information relating to the hardware address comprising a time of last use of the mobile device;

detecting the hardware address of the mobile device based on the information relating to the hardware address;

initiating a pairing of the mobile device with the information system based on the hardware address of the mobile device; and setting up the communication connection to the mobile device based on the pairing.

13. A method for a server in a network for providing information relating to a hardware address of a mobile device for a transportation vehicle, the method comprising:

receiving the information relating to the hardware address of the mobile device from the mobile device or from a further transportation vehicle and meta information relating to the hardware address comprising a time of last use of the mobile device;

determining meta information relating to the hardware address comprising a time of last use of the mobile device;

storing the information relating to the hardware address and the meta information; and providing the information relating to the hardware address of the mobile device and the meta information to the transportation vehicle.

14. A method for a mobile device for providing information relating to a hardware address of the mobile device for an information system of a transportation vehicle via a server in a network, the method comprising:

determining the information relating to the hardware address based on the hardware address of the mobile device and meta information relating to the hardware address comprising a time of last use of the mobile device; and providing the information relating to the hardware address and the meta information to the server.

15. A machine-readable medium storing program code, which, when executed on a processor, performs a method for setting up a communication connection to a mobile device by an information system of a transportation vehicle, the method comprising:

receiving (i) information relating to a hardware address of the mobile device and (ii) meta information relating to the hardware address comprising a time of last use of the mobile device;

detecting the hardware address of the mobile device based on the information relating to the hardware address;

initiating a pairing of the mobile device with the information system based on the hardware address of the mobile device and on the meta information; and setting up the communication connection to the mobile device based on the pairing.

* * * * *